Oct. 7, 1969   R. D. KAHN   3,471,829
MULTIPLE FLASHING LIGHT UNIT
Filed March 11, 1968   3 Sheets-Sheet 2
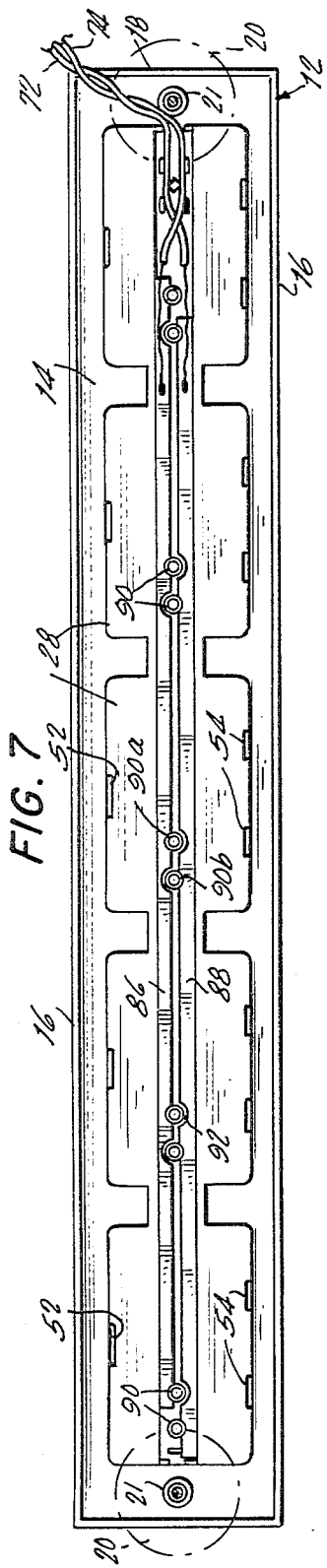
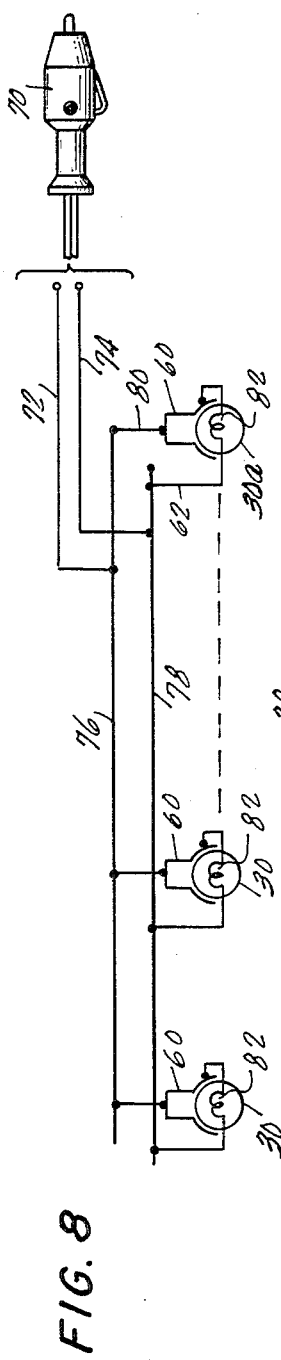
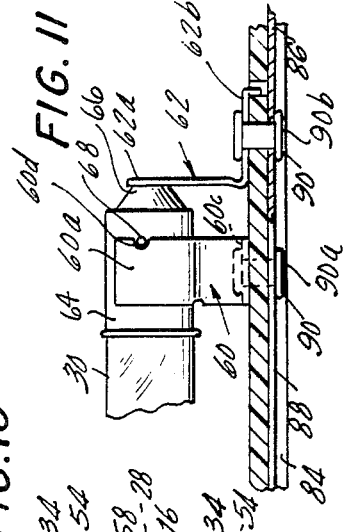
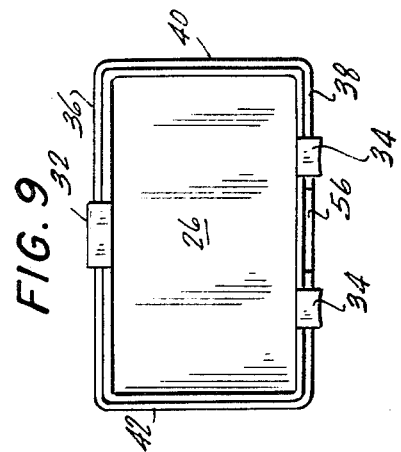
INVENTOR.
ROBERT D. KAHN
BY Amster Rothstein
ATTORNEYS

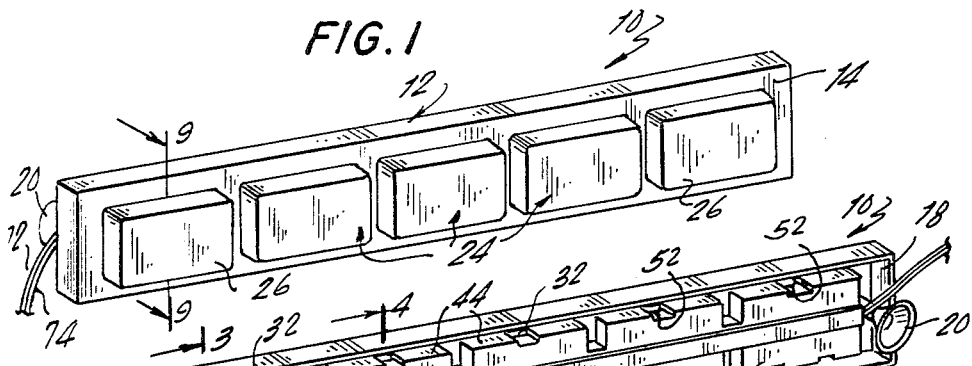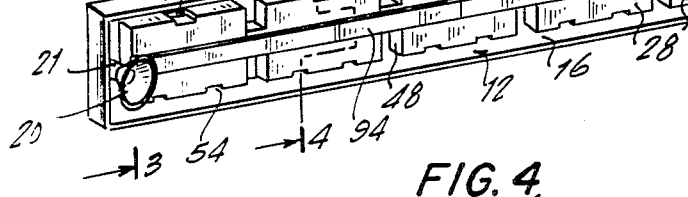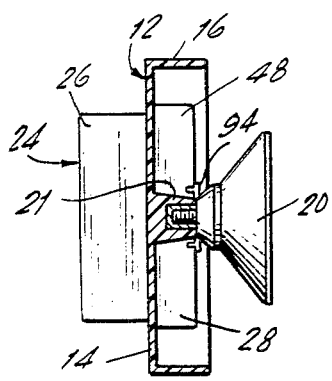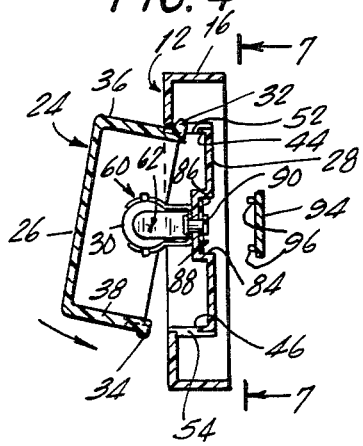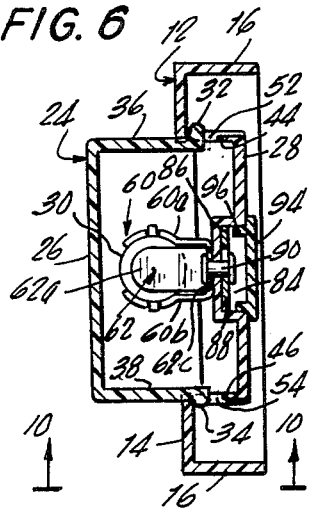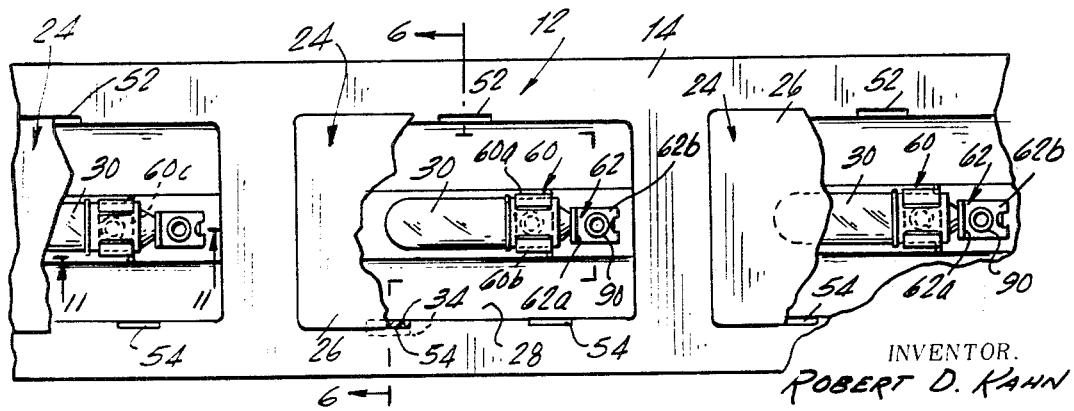

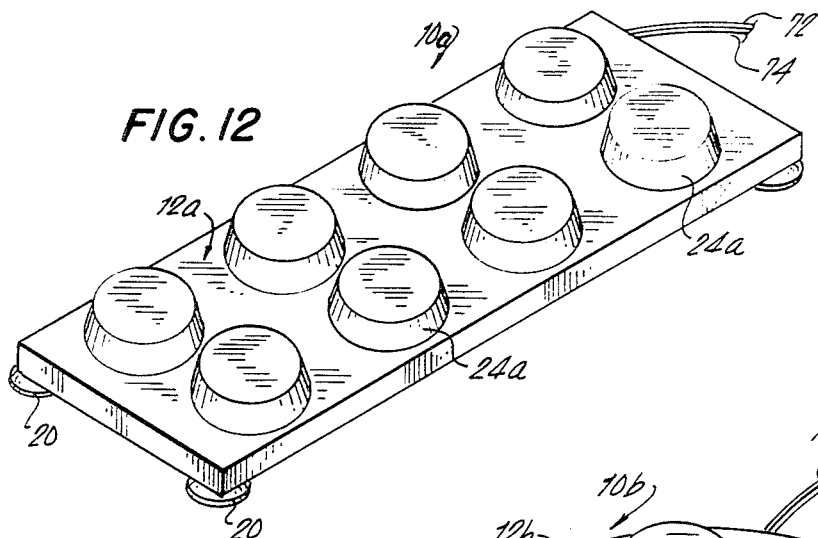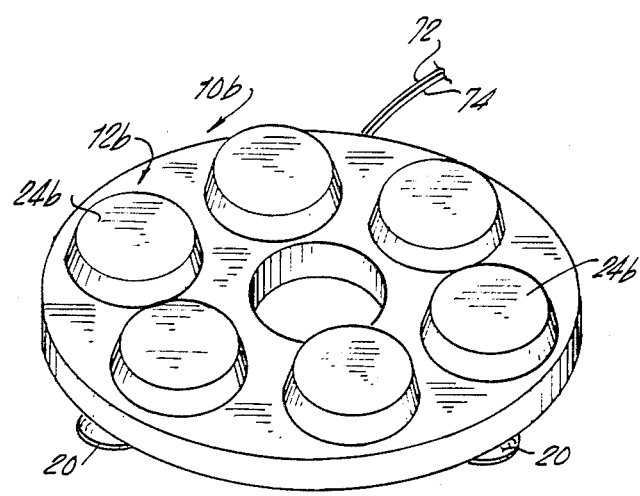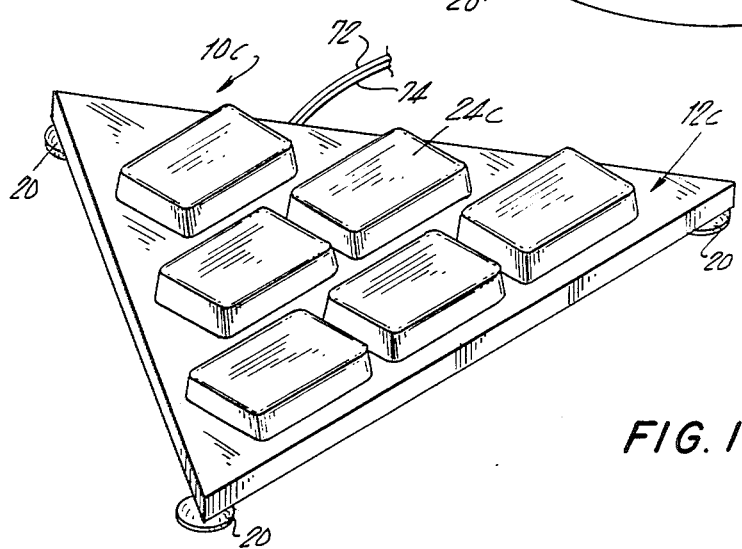

United States Patent Office 3,471,829
Patented Oct. 7, 1969

3,471,829
MULTIPLE FLASHING LIGHT UNIT
Robert D. Kahn, Rockville Centre, N.Y., assignor to Fedtro, Inc., Rockville Centre, N.Y., a corporation of New York
Continuation-in-part of application Ser. No. D. 9,385, Nov. 13, 1967. This application Mar. 11, 1968, Ser. No. 712,051
Int. Cl. B60q 1/46, 1/00; E01f 9/00
U.S. Cl. 340—81                                    10 Claims

ABSTRACT OF THE DISCLOSURE

An automobile accessory unit which comprises multiple flashing lights for giving a warning signal. The unit has a number of identical light cells, each cell including a translucent cover and an independently-flashing bulb mounted within the cell, the cells being carried on a housing. Each cell cover is removable for the purpose of replacing a bulb. Contacts electrically engaging each bulb are connected in parallel by elongated metal strips so that no soldering is required.

---

This is a continuation-in-part of application Ser. No. D. 9,385, filed Nov. 13, 1967, entitled Flashing Signal Unit, now Design Patent No. D. 212,722.

The present invention relates to a multiple flashing light unit, especially adapted to be used with an automobile to yield a flashing warning signal, when such is necessary.

It is the primary object of the present invention to provide a multiple flashing light unit of a type especially adapted for use in connection wtih an automobile in distress, and which is powered by the automobile battery.

It is another object of the present invention to provide a multiple flashing light unit of the type described which includes a plurality of identical light cells, each cell including a light bulb and means for flashing said bulb independently of the bulbs of different cells.

It is a further object of the present invention to provide a multiple flashing light unit of the type described wherein the cover for each cell is translucent, and desirably of a color such as red, thereby enabling the light unit to provide a flashing red signal to cars which are approaching it.

It is still another object of the present invention to provide a multiple flashing light unit of the type described wherein the cover for each cell is readily removable therefrom to enable replacement of the bulb therein, and each cover is readily reattachable to the housing of the unit to reassemble the device.

It is still another object of the present invention to provide a multiple flashing light unit of the type described wherein parallel elongated metal strips are utilized in connection with an electrical mounting for the light bulbs to connect said light bulbs in parallel, said mountings and strips being connected mechanically, thereby dispensing with the usual necessity for extensive soldering of connections.

In general, and in accordance with the present invention, the multiple flashing light unit comprises a housing which carries a pair of suction cups, the suction cups enabling the housing to be fixed to any surface of the automobile in distress. The housing carries a plurality of light cells. Each light cell comprises a light bulb and a translucent cover. The material of the cover is desirably red so that when the bulbs flash, a red flashing signal is observed by on-coming automobiles. Each bulb includes an integral flashing circuit and the bulbs are connected in parallel, whereby each bulb flashes independently of the other bulbs. The covers are readily removable from the housing for the purpose of replacing a light bulb, and once this replacement has been done, the cover can be readily snapped back onto the housing. Each light bulb is retained in place by a pair of contact members, and each of the contact members is mechanically fixed to the housing. The rear face of the housing has an elongated channel formed therein and a pair of elongated metal strips, parallel to one another, are situated in said channel. The contact members are mechanically attached directly to the strips and, more specifically, one contact member of each pair is connected to one of the strips and the other contact member of each pair is connected to the other strip. By way of this connection, the usually extensive soldering required in such units is dispensed with.

The above brief description, as well as further objects, features and advantages of the present invention, will be more fully appreciated by reference to the following detailed description of presently preferred, but nonetheless illustrative embodiments in accordance with the present invention, when taken in conjunction with the accompanying drawings, where:

FIG. 1 is a front perspective view of the multiple flashing light unit, in accordance with the present invention;

FIG. 2 is a rear perspective view of the unit;

FIG. 3 is an enlarged cross-sectional view of the unit taken substantially along the line 3—3 of FIG. 2;

FIG. 4 is a cross-sectional view of the unit taken substantially along the line 4—4 of FIG. 2 and showing a cover partially removed from its light cell;

FIG. 5 is an enlarged front plan view of a segment of the unit, with portions of the cell covers being removed to show the bulbs therein;

FIG. 6 is an enlarged cross-sectional view taken substantially along the line 6—6 of FIG. 5;

FIG. 7 is a rear plan view of the unit with the electrical strips which form a part of its circuit exposed;

FIG. 8 is a schematic view of the circuit diagram for the unit;

FIG. 9 is an internal view of a cover for a light cell, taken substantially along the line 9—9 of FIG. 1;

FIG. 10 is an enlarged side elevational and partly cross sectional view of the detachable retaining means for a cover;

FIG. 11 is an enlarged view of the mounting for a light bulb; and

FIGS. 12 through 14 show other embodiments of the present invention having different patterns of light cells.

Referring now in detail to the drawings, the present invention comprises a multiple flashing light unit 10 including an elongated generally rectangular housing 12. The housing 12 includes a front wall 14, a pair of opposed depending side walls 16 and a pair of opposed depending end walls 18.

The housing 12 carries a pair of suction cups 20 adjacent the end walls 18 which are provided to temporarily attach the housing 12 to any flat surface on an automobile. A pairs of supports 21 extend downwardly from the front wall 14 at opposite ends thereof, and each of the suction cups is secured to one of the supports. (See FIG. 3.)

The unit 10 further comprises a plurality, and desirably five, light cells 24 set in a row. Each light cell includes a generally rectangular-in-plan cover 26, a floor 28 and a light bulb 30. Each cell floor 28 is at a level slightly below the level of the front wall 14 of the housing (see FIG. 2) but is formed integrally with said front wall. Desirably, the covers 26 are formed of a translucent red synthetic resin so that, as will be described, flashing of the bulbs 30 causes multiple red flashing signals to be given off by the unit 10.

Means detachably secures the covers 26 to the floors 28 of the individual light cells 24. To this end, each of the covers 26 has an outwardly extending hinge lug 32 and a pair of opposed retaining lugs 34. More specifically, each cover has a pair of parallel side walls 36, 38 and another pair of parallel side walls 40, 42, the latter-named side walls 40, 42 being at right angles to the first-named side walls 36, 38. One of the side walls 36 carries the hinge lug 32 and the other of the side walls 38 carries the pair of retaining lugs 34. The aforesaid lugs are carried at the lower edges of their respective walls, and the hinge lugs 32 is carried centrally between the side walls 40, 42 while the retaining lugs 34 are spaced uniformly between the side walls 40, 42. (See FIG. 5.) The floor 28 of each cell 24 is especially configured to receive the aforesaid lugs 32, 34. More specifically, each floor 28 has a pair of upstanding parallel side walls 44, 46 and a pair of parallel end walls 48, 50. (See FIGS. 2, and 3–6.) The side wall 44 of each floor 28 has a single through slot 52 formed therein while the side wall 46 of each floor 28 has a pair of through slots 54 formed therein. The through slot 52 is located to receive the hinge lug 32 while the through slots 54 are located to receive the retaining lugs 34. (See FIGS. 4, 5 and 6.)

It should be noted at this point that the hinge lug 32 has a sharply outwardly protruding configuration in cross-section with relatively flat upper and lower faces whereby a person using the unit is not able to force the hinge lug into its slot 52 in the incorrect sequence, namely after having first placed the retaining lugs 34 in their respective through slots 54. On the other hand, the retaining lugs 34 have gently rounded upper and lower faces so that it is quite easy to first place the hinge lug 32 into its through slot 52, and thereafter force the retaining lugs 34 downwardly, the sloping lower faces of the retaining lugs serving to push the wall of the housing 12 slightly away to permit said retaining lugs to enter their respective slots.

The side wall 38 of the cover 26 defines a recess 56 (see FIG. 10) of sufficient height and width to receive a coin. An opposed surface 58 of the housing 12 intermediate the through slots 54 forms a bottom wall to define a slot with the recess so that when a coin is placed into the slot and is twisted, one face of the coin will bear on the housing surface 58 and the other face of the coin will bear upon the opposed cover wall of the recess 56, forcing the cover 26 away from the housing and forcing the retaining lugs 34 out of their slots 54. The gently sloping upper faces of the lugs 34 enable them to be pried out in the manner described. The cover is replaced, as has been said, by first placing the hinge lug 32 into its slot 52 and then forcing the cover towards the floor 28, so that the retaining lugs 34 are forced past the housing wall into their slots 54.

As has been mentioned, each light cell 24 includes a bulb 30, and each bulb is of the flasher type. More specifically, each bulb includes a bimetalic element in the bulb circuit which moves between positions closing a path of energization to the light emitting coil within the bulb and opening the path to said coil. The element moves due to its alternate heating and cooling between these positions. Such flasher bulbs are conventional and well known in the art.

A pair of contact elements 60, 62 are situated within each cell 24 and serve both to retain the bulb in place and to electrically contact said bulb. More specifically, the bulb 30 includes on one end thereof, a terminal sleeve 64 and a terminal tip 66 (see FIG. 11). The contact element 60 is yoke-shaped and comprises a pair of upstanding curved opposed arms 60a, 60b (see FIGS. 6 and 11) and a base 60c situated between and connecting the arms 60a, 60b. The arms 60a, 60b rise from the base 60c and the upper portions of the arms are curved concavely with respect to one another to engage opposed sides of the terminal sleeve 64 (see FIG. 6). The contact element 62 includes an upstanding forwardly biased spring arm 62a rising from a base 62b.

Further, the terminal sleeve 64 carries a pair of diametrically opposed radially outwardly extending projections 68 and each of the arms 60a, 60b has a recess 60d configured and spaced to receive one projection. As best seen in FIG. 11, the opposed arms 60a, 60b of the contact element 60 frictionally engage opposed sides of the terminal sleeve 64 and the arm 62a of the contact element 62 engages the terminal tip 66 of the bulb 30. Moreover, the contact element arm 62a urges the bulb in a direction such that the projections 68 are urged into the recesses 60d. The bulb may be easily removed by pushing the bulb so that the projections 68 move out of the recesses 60d and then pulling the bulb away from the contact element 60. The bulb is replaced by movement of the bulb in the opposed direction.

FIG. 8 illustrates the circuit diagram for the present device. It will be seen therefrom that the circuit is adapted to be connected to a source of power, desirably the battery of the automobile, by conventional cigarette lighter plug 70 which is inserted into a conventional cigarette lighter socket in the automobile. A pair of lead lines 72, 74 run from the plug 70 and connect to a pair of conductors 76, 78 which are in parallel. Each of the bulbs 30 is connected in parallel between the conductors 76, 78. More specifically, with relation to a typical one of the bulbs 30a, a lead 80 runs from the conductor 76 to the contact element 60, and said contact element 60 is connected to one of the terminals of a light emitting coil 82 within the bulb. The other end of said light emitting coil 82 is connected through the contact element 62 to the other conductor 78. To receive the conductors 76, 78 of said circuit, an elongated channel 84 is formed on the rear of the housing 12. More specifically, said channel is centered between the side walls 16 of the housing and runs substantially from one end wall 18 to the other end wall 18 (see FIG. 7). The channel passes as well through the floors 28 of the light cells 24. A pair of elongated metal contact strips 86, 88 are situated in the channel 84, the metal strip 86 corresponding to the conductor 76 in the circuit diagram of FIG. 8, and the metal strip 88 corresponding to the conductor 78 in said diagram. The contact elements 60, 62 are connected to the metal strips 86, 88 by conductive fasteners such as grommets 90. More specifically, the grommet 90a connects the contact element 60 to the strip 86 and the grommet 90b connects the contact element 62 to the strip 88. In so doing, the grommets 90 pass through apertures in the base wall of the channel 84. (See FIG. 11.) Accordingly, it will be appreciated that each grommet serves to hold a contact element to the housing, serves to hold a portion of a strip 86, 88 to the housing, and further serves to interconnect one of the contacts with its respective strip. The strips 86, 88 (see FIG. 7) are periodically formed with recesses 92 to accommodate a grommet 90 with which it is not connected, and to insure that no shorting takes place. The strips, 86, 88 are connected at one end to the lead lines 72, 74 which run to the plug 70.

In order to cover the strips 86, 88 so as to prevent accidental contact by persons therewith, an elongated channel cover 94 has a pair of upstanding side walls 96 which fit snugly within the channel and these walls, with the aid of an appropriate adhesive, serve to fix the channel cover 94 in place.

It will be appreciated that by virtue of a device simple in construction and few in number of parts, a multiple flashing light unit is presented which properly performs its desired function. When the plug 70 is placed into a cigarette lighter socket in an automobile, the bulbs 30 will be energized and will flash on and off independently of one another. Since the covers 26 are translucent and red, multiple flashing red lights will be made evident to an on-coming car, giving the desired warning of a hazardous condition. Should any of bulbs 30 burn out, a cover 26 of the appropriate light cell may be readily removed through the use of a coin, the bulb removed from its mounting and replaced, and the cover replaced over it.

Although the previous description has indicated that the covers 26 are translucent, it is within the scope of the present invention to provide transparent covers for the light cells made, for example, from a transparent plastic. In this instance, the bulbs 30 may themselves be colored or may be clear.

FIGS. 12 through 14 show additional embodiments of the present invention wherein the light cells form various patterns, other than the linear single-row pattern shown in FIG. 1. In FIG. 12, a unit 10a is shown in which the light cells 24a form two parallel linear rows on a rectangular housing, there being four cells to each row, so that there are a total of eight light cells. In FIG. 13, a unit 10b is shown having six light cells 24b arranged in a circle on a circular housing. In FIG. 14, a unit 10c is shown including six light cells 24c which are arranged in pyramid fashion on a triangular housing 12c. Adjacent the tip of the triangular housing 12C, a single light cell 24c is situated; next follows a row of two light cells 24c in a row; three light cells 12c in a row are situated adjacent the base of the triangular housing 12c.

What I claim is:

1. A multiple flashing light unit for yielding a warning signal comprising a housing, a plurality of light cells carried in a pattern on the housing, each light cell including a cover of light-transmitting material, a plurality of bulbs mounted on the housing, means detachably securing said covers over said bulbs, a plug adapted to be inserted into an automobile cigarette lighter socket, an elongated channel in the rear of said housing, at least two elongated contact strips mounted on the rear of said housing in said elongated channel for connecting said plug to said bulbs, an elongated cover for covering said channel and the contact strips mounted therein, and means for interrupting the current through at least some of said bulbs periodically to cause said at least some bulbs to flash.

2. A multiple flashing light unit as set forth in claim 1 wherein said detachably securing means includes a hinge lug and a retaining lug situated on opposed portions of each cover, and a plurality of slots on said housing adjacent each cell configured to receive said lugs.

3. A multiple flashing light unit as set forth in claim 2 wherein each hinge lug has substantially flat upper and lower faces and each retaining lug has relatively gently curving upper and lower faces.

4. A multiple flashing light unit as set forth in claim 2 wherein a portion of each cover adjacent its retaining lug and a portion of the housing define a slot adapted to receive a coin, whereby the twisting of a coin in the slot pries the retaining lug from its slot to enable removal of the cover from the housing.

5. A multiple flashing light unit as set forth in claim 1 wherein each of said current interrupting means is situated within a respective bulb and is integral therewith.

6. A multiple flashing light unit as set forth in claim 1 wherein each bulb includes a terminal sleeve and a terminal tip and further including means for mounting each bulb in one of said cells, each of said mounting means including a first contact member engaging the terminal sleeve and a second contact member engaging the terminal tip of a respective bulb.

7. A multiple flashing light unit as set forth in claim 6 wherein each of said second contact members comprises a spring arm biased toward the respective bulb terminal tip.

8. A multiple flashing light unit as set forth in claim 7 wherein the sleeve of each bulb carries a projection and each of said first contact members includes at least one recess, the spring arm of each second contact member biasing the projection on a respective bulb into the recess of a corresponding first contact member.

9. A multiple flashing light unit as set forth in claim 6 further including fasteners connecting each of said contact members to one of said contact strips.

10. A multiple flashing light unit as set forth in claim 9 wherein said fasteners are grommets.

References Cited

UNITED STATES PATENTS

| | | | |
|---|---|---|---|
| 884,514 | 4/1908 | Miller. | |
| 1,283,751 | 11/1918 | Hay. | |
| 1,555,524 | 9/1925 | Short. | |
| 2,134,313 | 10/1938 | Nordgran. | |
| 2,528,490 | 11/1950 | Berry | 340—90 |
| 2,755,373 | 7/1956 | Berry | 340—119 X |
| 2,799,854 | 7/1957 | Barnes | 340—321 |
| 3,090,949 | 5/1963 | Hallerberg | 340—366 |
| 3,302,195 | 1/1967 | Fuller | 340—366 X |

FOREIGN PATENTS 855,064  11/1952  Germany.

JOHN W. CALDWELL, Primary Examiner

KENNETH N. LEIMER, Assistant Examiner

U.S. Cl. X.R.

340—90, 119, 366